Nov. 8, 1938.  G. H. HUNT  2,135,666
BRAKE MECHANISM
Filed March 12, 1936  4 Sheets-Sheet 1
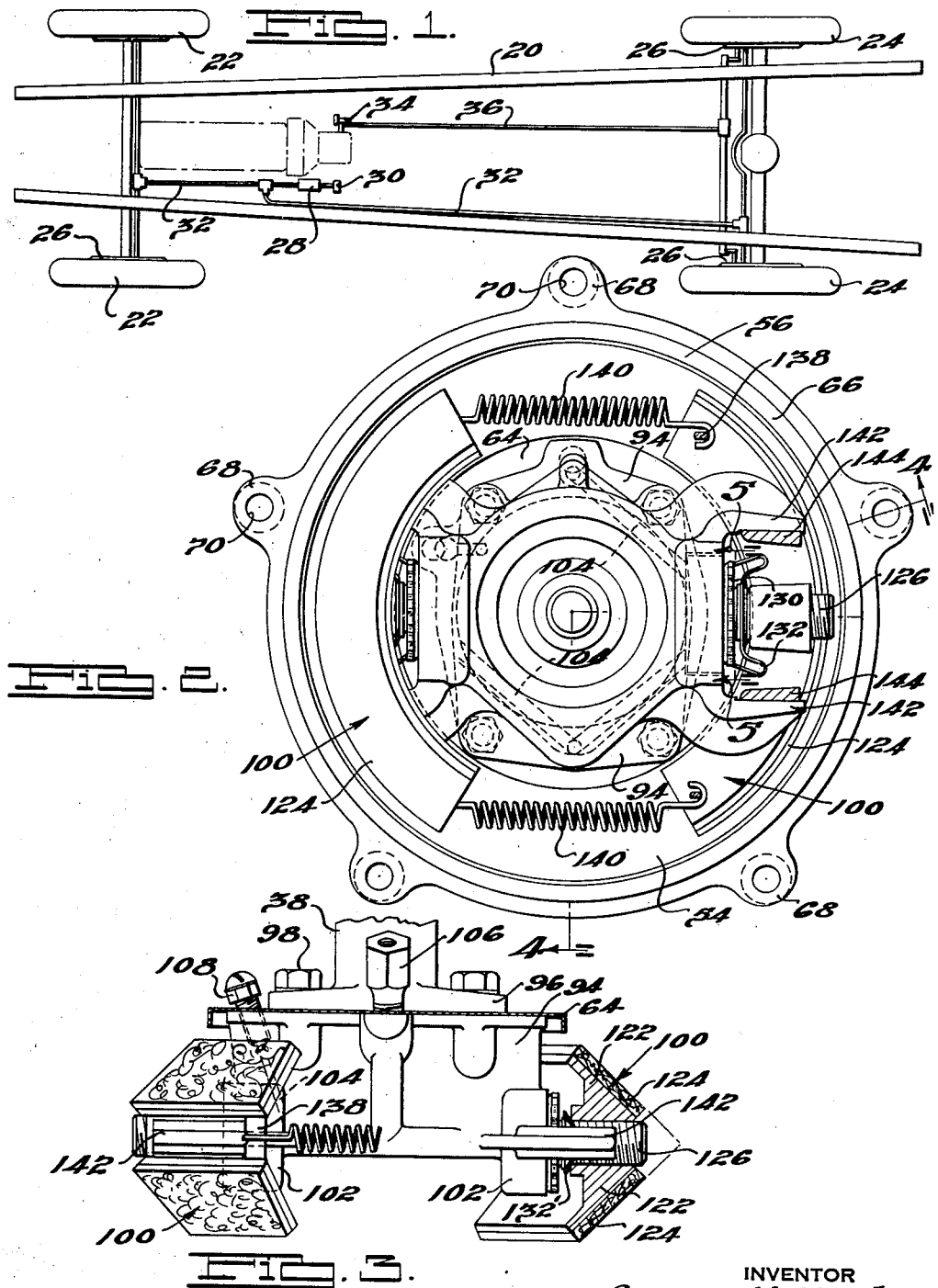
INVENTOR
George H. Hunt.
BY
ATTORNEY Nov. 8, 1938.     G. H. HUNT     2,135,666
BRAKE MECHANISM
Filed March 12, 1936     4 Sheets-Sheet 2
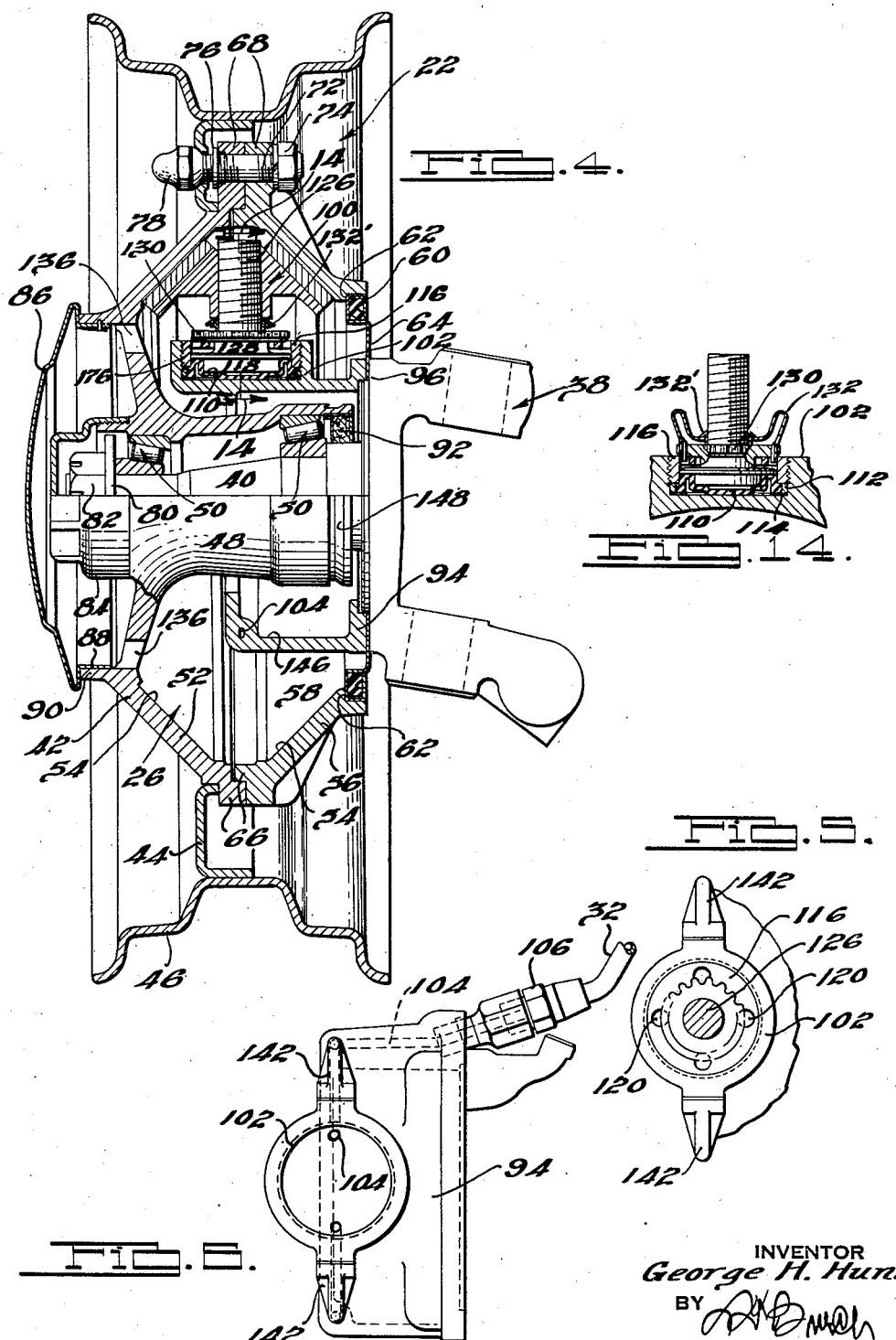
INVENTOR
George H. Hunt.
BY
ATTORNEY Nov. 8, 1938.　　　　G. H. HUNT　　　　2,135,666
BRAKE MECHANISM
Filed March 12, 1936　　　　4 Sheets-Sheet 3
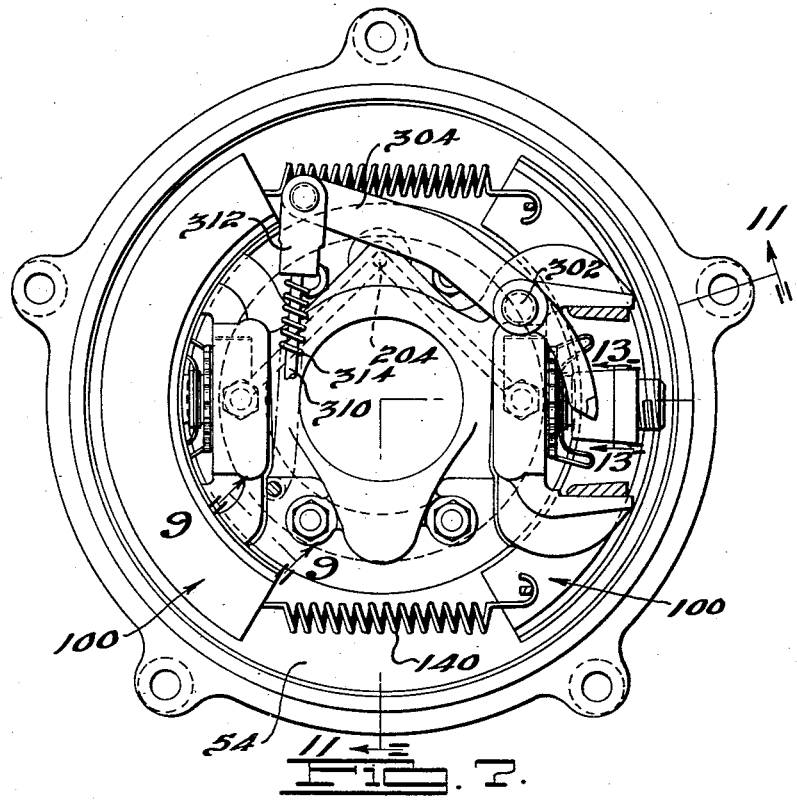
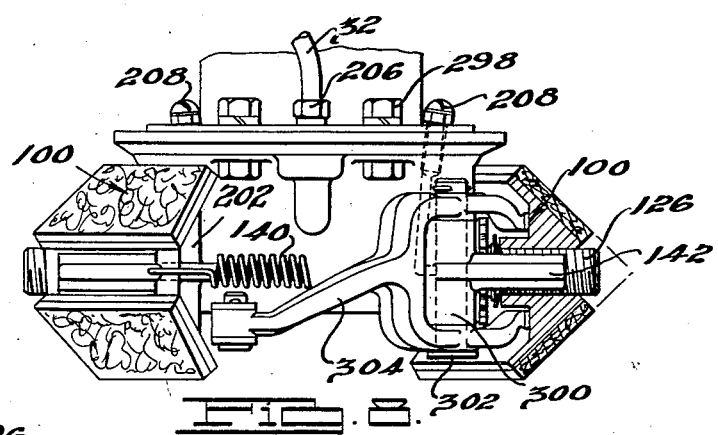
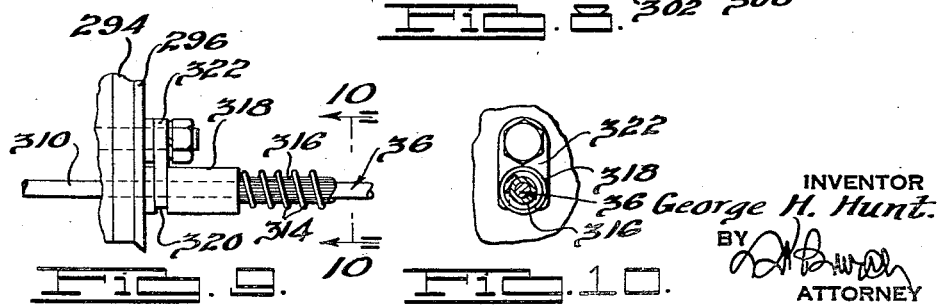
INVENTOR
George H. Hunt.
BY
ATTORNEY Nov. 8, 1938.  G. H. HUNT  2,135,666
BRAKE MECHANISM
Filed March 12, 1936  4 Sheets-Sheet 4
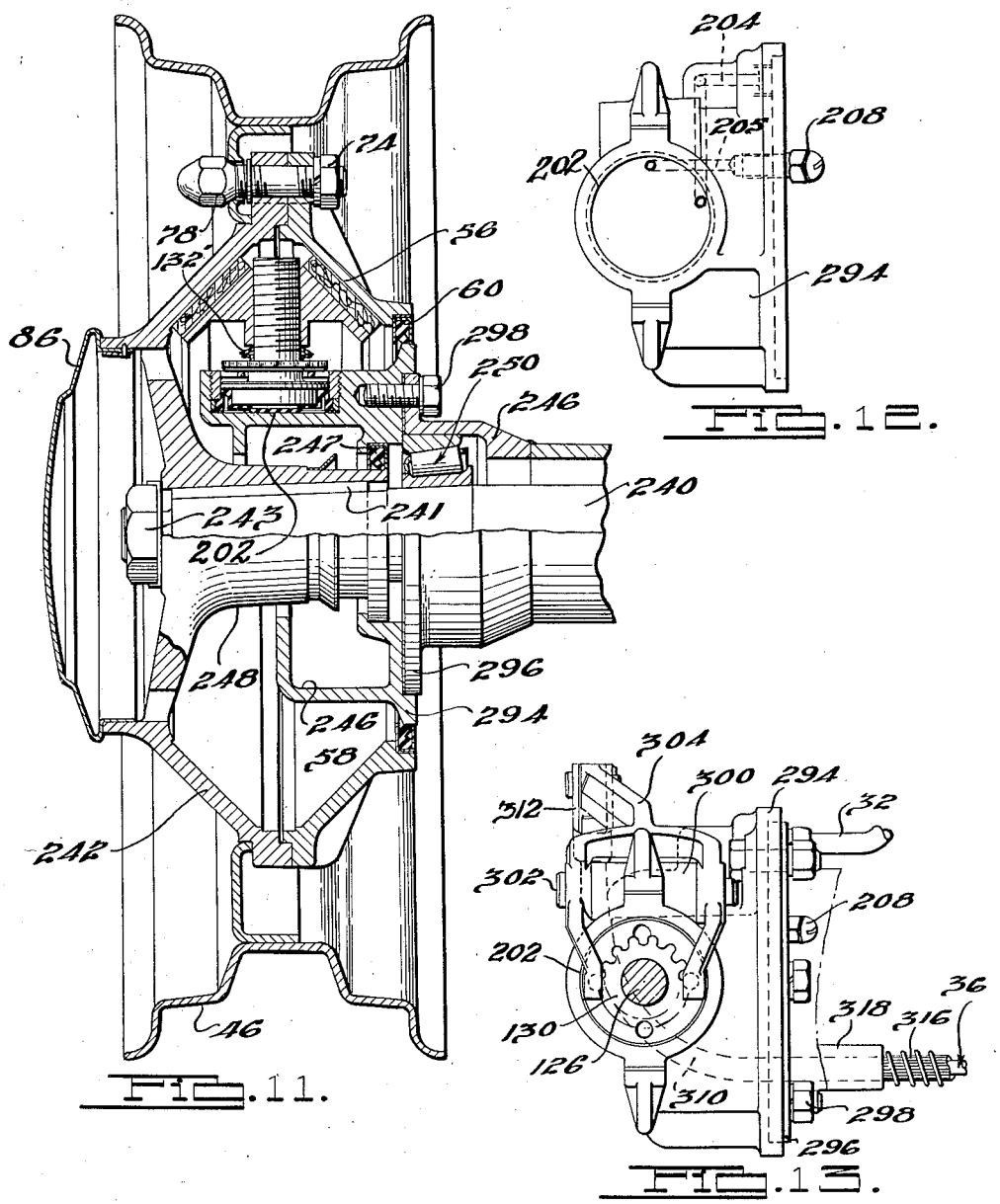
INVENTOR
George H. Hunt.
BY
ATTORNEY Patented Nov. 8, 1938

2,135,666

UNITED STATES PATENT OFFICE 2,135,666

BRAKE MECHANISM

George H. Hunt, Detroit, Mich., assignor, by mesne assignments, to Detroit Hydrostatic Brake Corporation, a corporation of Michigan Application March 12, 1936, Serial No. 68,483

17 Claims. (Cl. 188—106)

This invention, in general, relates to hydraulic braking systems and particularly to wheel brake construction therefor.

A principal object of the invention is to provide a fully enclosed wheel brake structure so that the braking mechanism is not subjected to dirt, water, grease, etc., thereby to eliminate many causes of unequal braking action, excessive wear of the brake lining, changes in coefficient of friction of the lining and scoring of the brake drum surfaces.

Another object of the invention is to provide a wheel brake structure which is of less weight than that of the wheel brake structures now commonly in use so as to reduce the unsprung weight of the vehicle and the momentum due to the weight of the wheels.

Another object of the invention is to provide a wheel brake construction in which the brake mechanism is located in the center line of the wheel and in which the braking pressure is uniformly applied at all points of the braking surface so as to perform the same amount of work with each of the brake linings and each part thereof, thereby obtaining the same wear on each of the brake linings and each part thereof, and also to reduce scoring and excessive heating due to deformation of the drum, scoring and excessive wear of the brake lining at local spots.

Another object of the invention is to provide a wheel brake construction wherein the brake mechanism is located in the center line of the wheel so that a wider frame for the vehicle may be used, and so that the distance between the centers of the spring pads can be increased.

Another object of the invention is to eliminate brake squeal by preventing lateral vibration of the brake shoes.

Another object of the invention is to provide a wheel brake construction provided with a substantially greater braking area than that of the brake constructions now commonly used, wherein the parts thereof are symmetrically and more compactly arranged so as to permit the use of a wheel with a smaller outside diameter and greater tire capacity, and to provide a wheel brake construction which is more durable due to the symmetry of the wheel and wheel brake construction.

Another object of the invention is to provide an improved form of brake mechanism in which equal braking is obtained for forward and reverse movement and in which self-energizing action is eliminated.

Another object of the invention is to provide an improved form of brake mechanism wherein the braking action is directly proportional to the brake pedal pressure for effecting better braking control of the vehicle so as to permit bringing the vehicle to a stop at a constant rate of deceleration.

Another object of the invention is to provide a braking system wherein the braking of all four wheels is uniform.

Another object of the invention is to provide a wheel brake construction with provisions for more effectively dissipating the heat energy due to braking, thereby reducing the temperature of the brake lining.

Another object of the invention is to provide a wheel brake construction wherein the braking surfaces on the drum are exposed to the air stream for cooling, and wherein the brake operating mechanism is fully enclosed so that the expansion of the parts of the wheel brake structure, such as the drum, the brake shoes, the mounting therefor and the wheel, due to excessive heating of these parts, does not so change the normal clearance between the brake shoe and the brake drum as to impair the efficiency or operation of the brakes during such time as the same are in a highly heated condition.

Another object of the invention is to provide in a wheel brake construction, a brake drum having a relatively small brake diameter so as to decrease the linear speed of the drum surface relative to the brake shoes.

Another object of the invention is to provide a hydraulic braking system wherein the braking fluid is sealed within the system and hence not exposed at any time to the atmosphere or subject to condensation, evaporation or leakage.

Another object of the invention is to provide a hydraulic braking system wherein the parts are so designed and arranged so that only a relatively small amount of fluid is required in the system.

Another object of the invention is to provide a braking system wherein certain of the brake shoes, which are normally actuated hydraulically, are provided with means whereby such brake shoes may be actuated mechanically so as to provide a parking brake.

In general, the hydraulic braking system of my invention comprises a master cylinder provided with means for operating the same, such as the conventional foot brake pedal, braking structure operatively associated with each of the wheels of the vehicle, and fluid lines affording communication between the master cylinder and each of the braking structures. The wheel brake structure, as illustrated, comprises in general, a brake drum comprising two angularly related surfaces, a part of which drum constitutes the hub portion of a wheel, a radially disposed wheel portion detachably connected to the hub portion, a tire bearing rim integral with the wheel portion, the braking surfaces being symmetrically disposed with respect to the center line of the wheel, the brake drum forming an enclosure within which the brake mechanism is disposed and which brake mechanism comprises a stationary spider fixedly secured to the axle of the vehicle and constituting a support for the brake shoes, a pair of oppositely disposed brake shoes each having segmental double faced angular shoes of a form complementary to that of the brake drum, and which brake shoes are disposed within the drum and supported by the spider, and hydraulically operated means carried by the spider and operatively associated with each of said brake shoes for actuating the same, the brake shoes of the rear wheels being additionally provided with a mechanically actuating means carried by the spider so that certain of the brake shoes of the rear wheel brakes may be operated so as to provide a parking brake for a vehicle.

For a further understanding of the invention, reference may be had to the following specification taken in conjunction with the accompanying drawings of which there are four sheets, and in which:

Fig. 1 is a diagrammatic view illustrating the application of a hydraulic brake system to the chassis of a motor vehicle;

Fig. 2 is an elevational view of the front wheel brake construction, one of the brake drum surfaces having been removed and certain of the parts being illustrated in section;

Fig. 3 is a plan view of the spider and brake shoe construction of Fig. 2, one of the brake shoes being shown in section;

Fig. 4 is a section taken on the line 4—4 of Fig. 2, certain of the parts being illustrated in elevation;

Fig. 5 is a section taken in a plane on the line 5—5 of Fig. 2;

Fig. 6 is an elevational view of the spider construction illustrated in Fig. 2;

Fig. 7 is an elevational view illustrating the rear wheel brake construction with one of the brake drum members removed and certain of the parts being shown in elevation;

Fig. 8 is a plan view of the spider and brake construction illustrated in Fig. 7, one of the brake shoes being shown in cross section;

Fig. 9 is a sectional view on the line 9—9 of Fig. 7;

Fig. 10 is a section taken on the line 10—10 of Fig. 9;

Fig. 11 is a sectional view of the rear wheel brake construction taken on the line 11—11 of Fig. 7;

Fig. 12 is an elevational view of the spider construction for the rear wheel brakes;

Fig. 13 is a section taken on the line 13—13 of Fig. 7 and illustrating the mechanical actuating means for one of the rear wheel brake shoes; and Fig. 14 is a section taken on the line 14—14 of Fig. 4.

Referring now to Fig. 1 of the drawings there is diagrammatically illustrated, a chassis of a motor vehicle including a frame 20, a pair of front road wheels 22, a pair of rear road wheels 24, each of the road wheels having operatively associated therewith a wheel brake structure 26, and a master cylinder 28 suitably mounted upon the frame of the chassis and provided with means, such as a foot brake pedal 30, for operating the master cylinder, which is connected by a fluid line 32 to the front and rear wheel brake structures 26 for actuating the same. A parking brake lever 34 is operatively connected to a cable 36 leading to the rear wheel brakes 26 so that the same may be mechanically actuated.

In Figs. 2 to 6, inclusive, there is illustrated the application of a brake construction embodying my invention to the front wheels of a conventional type of automotive vehicle provided with a steering knuckle 38 having a spindle 40 forming an axle for the front wheels 22 which comprises a hub portion 42, a connecting spoke or wheel portion 44 detachably secured thereto, and a tire carrying rim 46 connected with the wheel portion 44 so as to be removable therewith.

The hub portion 42, constituting the hub of the wheel, comprises a sleeve-like portion or cylindrical member 48 concentrically arranged when assembled with respect to the spindle 40 and between which and the spindle 40, a pair of bearings 50 are operatively disposed for supporting the wheel for rotation relative to the spindle 40, and a portion 52 extending generally in a radial direction and constituting a part of a brake drum which includes a pair of annular spaced apart and angularly related braking surfaces 54. The sleeve portion 48 and the radially extending portion 52 of the hub 42 preferably are formed integrally as a casting and may be designed so as to be used in connection with any conventional form of steering knuckle and spindle.

The hub portion 42, it will be observed, is formed so as to provide a recess on the inside face thereof, which recess forms a part of a chamber within which the brake mechanism is housed, and which chamber is closed by a member 56 which provides a braking surface 54, and which member 56 is fixedly secured to the periphery of the hub 42 so as to define with the hub 42 of the wheel, a chamber 58. The member 56 does not constitute a part of the wheel structure or form a support for the rim 46, but is supported by the wheel and so formed as to provide in conjunction therewith, the chamber 58 within which the brake mechanism is housed. The chamber 58 is adapted to be closed about the knuckle 38 by means of a seal 60 seated within a shoulder 62 provided on the member 56 and cooperating with a stationary plate 64 secured to the steering knuckle 38. Thus, it may be observed that the chamber 58 is fully enclosed and substantially sealed so as to prevent the entrance thereinto of dirt, water and grease which would impair the efficiency and operation of the braking mechanism.

The hub portion 42 of the wheel and the brake drum member 56 cooperating therewith are provided with complementary projections 66 for locating the braking surfaces 54 relative to each other, and with a series of radially disposed ears 68 provided with aligned openings 70 through which openings stud bolts 72 extend, and which bolts have secured thereon nuts 74 whereby the member 56 may be fixedly secured to the hub 42 of the wheel. The bolt 72 is provided with a shoulder 76 fixed thereto so that the brake drum member 56 may be secured to the hub 42 of the wheel independently of the tire carrying rim 46 and wheel portion 44. The outside end of the bolt 72 is adapted to extend through an opening in the wheel portion 44 and has secured thereto a nut 78 whereby the rim 46 and wheel portion 44 are secured to the hub 42 for rotation therewith.

The hub 42 is secured upon the spindle 40 through the intermediary of a washer 80, which backs up one of the bearings 50, and a nut 82, which is threaded onto the threaded end of the spindle 40. A cap 84 may be threaded on to a projecting portion of the sleeve portion 48 for sealing the space within which the bearings 50 are disposed, and a hub cap 86 may be provided for covering the central portion of the wheel and the cap 84. The hub cap 86 is provided with an annular rim 88 which is adapted to telescopically engage an annular rim portion 90 of the hub 42. A grease seal 92 may be provided internally of the sleeve portion 48 at the end thereof and cooperating with the spindle 40 for sealing the space within which the bearings 50 are disposed against the leakage of grease therefrom into the brake mechanism chamber 58.

For supporting the brake mechanism within the chamber 58, there is provided a spider or support 94 which is bolted to a flange 96 on the steering knuckle 38 by a plurality of stud bolts 98 which extend through suitable openings in the flange 96 of the steering knuckle 38 and into suitable threaded openings formed in the body of the spider 94, the plate 64 being confined between the spider 94 and the flange 96. The spider 94 is disposed within the chamber 58 and is secured against rotation and is adapted to support a pair of oppositely disposed segmental double faced angular brake shoes 100 for movement in a radial direction.

The spider 94 comprises a body casting which is formed to provide a pair of oppositely disposed pockets 102, a fluid passageway 104 connecting the pockets 102 in series and one end of which passageway 104 is connected by means of a fitting 106 to a branch of the fluid line 32, a part of the fitting 106 being threaded into a threaded opening formed in the spider 94 at one terminal of the passageway 104, and the other portion of the fitting 106 being suitably secured to the end of a piece of tubing in any conventional manner, and the other terminal of passageway 104 leads to atmosphere but is closed by a threaded valve plug 108. The valve plug 108 normally is closed, but may be opened for bleeding the system by pumping fluid into the wheel brake structure through the fitting 106 and circulating such fluid in series through the pockets 102 and the passageway 104 which connects the same, and thence through the terminal which is controlled by the threaded valve plug 108.

Each of the pockets 102 is circular in shape and is adapted to provide in connection with the parts hereinafter described, a fluid cylinder and piston construction operable for actuating the brake shoes 100. Across each of the pockets there is disposed a flexible wall or diaphragm 110 which is sealed around its edge to the wall of the pockets 102. The diaphragm 110 comprises a resilient diaphragm or membrane of cup-shaped formation which is folded back upon itself and which at its periphery is bonded to a metallic reinforcing ring 112 which is confined between a gasket 114, lying in the bottom of the pocket 102, and a member 116 threadedly cooperating with the threaded wall of the pocket 102 for securing ring 112 in position for securing the diaphragm 110 in position and sealing the same so as to prevent the escape of fluid from the fluid chamber which is formed between the bottom wall of the pocket 102 and the adjacent side of the membrane 110. On the side of the membrane 110 opposite the fluid chamber, there is provided a piston 118 which is disposed within the limits of the threaded member 116. The threaded member 116 extends across the pockets 102 at the open end thereof except for a central opening through which a reduced portion of the piston 118 extends, and also except for a plurality of spaced notches or openings 120.

Each of the brake shoes 100 comprises a pair of segments 122 integrally formed and adapted to support a pair of brake lining members 124 angularly relative to each other and opposite the braking surfaces 54 provided by the brake drum. Centrally, each of the brake shoes 100 is provided with a threaded opening into which is threaded an adjusting screw 126, the bottom of the screw 126 being enlarged and adapted to seat upon the reduced portion 128 of the piston 118 which projects through the central opening in the member 116. The enlarged portion 130 of the screw 126 is notched peripherally and a spring 132, carried by the screw 126 and secured by a snap ring 132', is adapted to engage in the notches on the portion 130 and in oppositely disposed notches 120 provided in the member 116 for securing the screw 126 against accidental rotation. The clearance between the brake lining member 124 and the braking surfaces of the brake drum may be adjusted by threading of the screw 126 within the threaded openings in the shoes 100, and when the brakes are set up, this may be accomplished by inserting the end of a screw driver through the openings 136, provided in the hub 42 of the wheel, and engaging the end of the screw driver with the notches for threading the screw 126 relative to the shoe 100.

Each of the ends of the segments of the brake shoes 100 are connected by a rib 138, and a pair of springs 140 have their ends connected to the ribs 138 for constraining the brake shoes 100 to a retracted position or out of operative engagement with the braking surfaces on the brake drum. Because the screw 126 is not rigidly connected with the piston 118, the brake shoe 100 is free to shift laterally so as to insure a proper and uniform engagement between each of the brake lining members 124 and the brake drum surfaces 54. The spider 94, adjacent each of the pockets 102, is provided with a pair of guide and reaction members 142, which cooperate with guide portions 144 formed on the brake shoe 100 and connected to the segments thereof, for guiding the shoes for radial movement and for resisting displacement of the brake shoes from their normal position when the brakes are applied for stopping the rotation of the drum, and the members 142 take the torque reaction of the application of the brakes.

The spider 94 is hollow internally thereof to receive the sleeve portion 48 of the wheel hub and also to act as a trough or oil drain 146 for whatever grease may escape from within the bearing chamber, the end of the sleeve portions 48 being provided with a radially extending tapered surface 148 for throwing off whatever grease may be disposed thereon into the trough 146.

In Figs. 7 to 13, inclusive, there is illustrated the application of a brake structure embracing my invention to the rear wheels of a motor vehicle having a semi-floating axle. In the construction illustrated in these figures, the entire wheel including the hub, the wheel portion, and the tire bearing rim portion are constructed substantially like the front wheel construction except that the hub of the rear wheel is keyed to the axle shaft for rotation therewith and thus has a different bearing support. The brake mechanism housing within the rear wheel brake drum is substantially identical with that utilized in the front wheel brake drum except that in the case of the rear wheel brake structure, the spider construction is of slightly different form on account of the different bearing support for the wheel, and there is additionally provided for the rear wheel brakes, a mechanical actuated means for setting the brakes so as to utilize the rear brakes as a parking brake.

As the majority of parts used in the front and rear wheel brake structure are interchangeable and have the same construction, characteristics and dimensions, the same reference characters will be used in connection with the parts of the rear wheel brake structure which are identical with the front wheel brake structure. Referring to Fig. 11, it will be observed that the hub 242 of the rear wheel is provided with a sleeve-like portion 248 which closely fits the axle 240 and is secured thereto for rotation therewith by a key 241 and a nut 243 threadedly engaging the end of the axle shaft 240 and holding the hub 242 in position. The axle shaft 240 is supported adjacent its outer end thereof by a bearing means 250 disposed within the end portion of the axle housing 246, which axle housing is provided with a flange 296 to which the spider 294 is secured, such as by means of a plurality of bolts 298 extending through openings in the flange 296 and threadedly engaging in threaded openings formed in the spider 294. Between the spider 294 and the drum member 56, there is disposed a seal 60 for sealing the chamber 58, formed within the hub 242 and the drum member 56, against the entrance of dirt, water and grease thereinto.

The brake fluid for the rear wheel brakes is fed from the fluid lines 32 through a fitting 206 to a branched passageway 204, each of the branches thereof leading to a pocket 202 which forms the cylinders for the rear wheel brake shoes, a passageway 205 being provided leading from each of the pockets adjacent the upper portion thereof and opening to the outside of the brake in an atmospheric terminal normally being closed by a valve plug 208 similar to the valve plug 108. The valve plugs 208 may be opened so that the rear wheel brakes may be bled.

The spiders 294 for rear wheel brakes are each provided with a boss 300 in which a shaft 302 is journaled, and which shaft 302 forms a pivot for a bifurcated lever 304, the bifurcations of which are journaled on the shaft 302 and the end of which bifurcations are engageable with the underside of one of the brake shoes 100 of each of the rear wheel brakes, and the other end of which lever 304 is connected to a cable 36 which leads to a parking brake lever. The cable 36 comprises a wire 310 connected to a forked member 312 which is pivoted to the end of the lever 304, and that portion of the cable 310 which is disposed within the chamber 58 is encased in a spring guide 314, which spring guide rests upon a curved surface formed upon the spider 294 and passes out through aligned openings in the spider 294 and the flange 296 of the axle housing. Externally of the brake drum, the cable 310 is sheathed and the brake drum end of the sheath 316 terminates in a fitting 318 provided with a groove 320, a portion of the fitting 318 extending into an opening in the flange 296 and the groove 320 in the fitting 318 being engaged by a locking finger 322 suitably secured to the flange 296.

The spiders 294 for the rear wheels are formed like the spiders for the front wheels to provide an oil drain 246 internally of the brake drum, and a seal 247 may be provided between the axially extending portion of the hub 248 and the spider 294 for sealing the chamber within which the bearing 250 is disposed.

In operation, the actuation of the master cylinder 28 will subject the fluid within the fluid line 32 to pressure and cause the introduction of such fluid under pressure into the space between the bottom of the pockets 102 and the diaphragm 110, as a result of which, the piston 118, the screws 126, and shoes 100 are moved radially so as to move the brake lining members 124 into operative engagement with the brake surfaces 54. As the screws 126 are separable from the piston 118, the shoes 100 are free to center and properly align themselves with the brake drum so as to properly present the brake lining members 124 to the braking surfaces 54. Release of pressure on the fluid will operate to permit the springs 149 to return the brake shoes to their inoperative or retracted position.

While the invention has been described with some detail, it is to be understood that the description is for the purpose of illustration only and is not definitive of the limits of the inventive idea. The right is reserved to make such changes in the details of construction and arrangement of parts as will fall within the purview of the attached claims.

I claim:
1. Wheel brake structure comprising a supporting member including a flange located inside the centerline of the brake, a sleeve, bearing means operatively disposed between said member and said sleeve for supporting said sleeve for rotation, said sleeve comprising a part of a wheel hub, said hub including a part integral with said sleeve and extending in a general radial direction from adjacent one end of said sleeve, a brake drum member secured to and supported by the hub adjacent the periphery thereof and disposed about said sleeve so as to form an annular chamber therebetween, a spider rigidly and directly secured to said flange radially outwardly of said bearing means and disposed within said chamber, and braking members carried by said spider and cooperable with said brake drum member.

2. Wheel brake structure comprising a supporting member, a sleeve, bearing means operatively disposed between said member and said sleeve for rotatably supporting said sleeve, said sleeve comprising a part of a wheel hub, said hub including a part integral with said sleeve and extending in a general radial direction from one end of said sleeve, a laterally extending brake drum member secured to said hub adjacent the periphery thereof and disposed about said sleeve so as to form an annular chamber therebetween, a spider secured to said supporting member radially outwardly of said bearing means and disposed within said chamber, braking members carried by said spider and cooperable with said brake drum member, sealing means operatively disposed between said supporting member and said brake drum member for sealing said chamber, and means for actuating said braking members entering said brake structure outside the locus of said bearing means.

3. Wheel brake structure comprising supporting means including a flange, a wheel hub rotatably supported by said supporting means and including an annular portion affording a braking surface, a brake drum member affording a braking surface and secured to and supported by said hub so that said braking surfaces are symmetrically arranged with respect to the axis of rotation of said hub, said hub and said brake drum member being arranged to define an annular chamber between the same and the axis of rotation of said hub, said supporting means including a portion extending within said annular chamber, braking members carried by said portion within said chamber and cooperable with said braking surfaces, and sealing means arranged between said brake drum member and said flange for sealing said annular chamber.

4. Wheel brake structure comprising supporting means, a wheel hub supported for rotation thereby and including an integral laterally extending annular portion formed to provide a braking surface, an annular member secured to and supported by said hub and extending radially outwardly therefrom and arranged to define in conjunction therewith an annular chamber about the axis of rotation of said hub, said supporting means being provided with a portion disposed within said chamber, braking means carried by said portion of said supporting means and cooperable with said braking surface, and sealing means arranged between said annular member and said supporting means for enclosing said chamber.

5. Wheel brake structure comprising a pair of oppositely disposed frusto-conical brake drum members abutting each other at their greatest peripheries, means securing said members together at their peripheries for supporting one of said member from the other of said members, a rotatable cylindrical member arranged centrally of said drum members and having a radially extending portion integrally connected with said cylindrical member and with one of said brake drum members for supporting said members, said members being arranged to define an annular chamber, a support projecting within said chamber outwardly of said cylindrical member, radially movable braking members carried by said support and cooperable with said brake drum members, and a seal arranged between the inside periphery of the supported brake drum member and said support for sealing said chamber, and means for actuating said braking means entering said brake structure outside the periphery of said cylindrical member.

6. Wheel brake structure comprising a pair of oppositely disposed frusto-conical brake drum members abutting each other, means securing said members together at their abutting edges for supporting one of said members from the other of said members, a rotatable cylindrical member arranged centrally of said drum members and having projecting therefrom outwardly of the centreline of the brake a radially extending portion connected with one of said drum members and with said cylindrical member for supporting both of said brake drum members from the radially extending portion of said cylindrical member, said members being arranged to define an annular chamber about said cylindrical member, a support arranged radially outwardly of said cylindrical member and projecting outwardly into said chamber from inwardly of the centreline of the brake, and a plurality of segmental double faced angular braking members mounted on said support and arranged for radial movement into operative engagement with said brake drum members.

7. Wheel brake structure comprising a pair of oppositely disposed frusto-conical brake drum members abutting each other, means securing said members together, means for supporting said brake drum members for rotation, said brake drum members being arranged to provide an annular chamber therein, a support arranged to be stationary and disposed within said chamber, a plurality of segmental double faced angular braking members cooperable with said drum members and having a flat portion, guide means carried by said support and arranged for supporting said braking means for movement in a radial direction, said braking means being free to shift laterally so as to properly align themselves with the surfaces of said brake drum members, and means carried by said support and engageably operable with said flat portion for moving said braking means into engagement with said brake drum members and permitting the lateral shifting thereof.

8. Brake mechanism comprising a wheel hub formed to provide an annular braking surface, a member carried by said hub and supported thereby inwardly of the centerline of the brake and arranged in conjunction with said hub to provide a chamber, a stationary support extending within said chamber, sealing means arranged between said support and said member for sealing said chamber, a brake shoe supported by said support and cooperable with said braking surface, and means carried by said support and associated with said brake shoe for moving the same into engagement with said braking surface.

9. Braking mechanism comprising a member having a braking surface, a movable braking member cooperable therewith, a support for said braking member and provided with guide means therefor, said braking member being arranged for sliding movement in said guide means, said support including a hydraulically actuated piston, and said braking member including a member threadedly secured thereto and seating upon said piston and reached from without and through said first mentioned member.

10. Braking mechanism comprising a member having a braking surface, a movable braking member cooperable therewith, a support having guide means for said braking member, a movable member carried by said support and arranged for actuating said braking member, a connection between said movable member and said braking member and including a stem threadedly secured to said braking member and reached for adjustment through said first mentioned member, and spring means for maintaining said stem in engagement with the other of said members.

11. Braking mechanism comprising a braking surface, a braking member cooperable therewith, a support having guide means for said braking member, a movable member carried by said support and arranged for actuating said braking member, a connection between said movable member and said braking member and including a stem threadedly secured to one of said members, spring means for maintaining said stem in engagement with the other of said members, and means including a fork straddling said stem and engageable with said braking member independently of said stem for actuating said braking member.

12. Braking mechanism comprising a braking surface, a braking member cooperable therewith, a support having guide means for said braking member, a movable member carried by said support and arranged for actuating said braking member, a connection between said movable member and said braking member and including a stem threadedly secured to one of said members, spring means for maintaining said stem in engagement with the other of said members, means associated with said stem and engageable by a tool, and a spring associated with said last named means and operable for preventing accidental movement thereof.

13. Braking mechanism comprising a member having a braking surface, a braking member cooperable therewith, a support for said braking member, said support comprising a body formed to provide a pocket, a passageway in said body having a terminal in said pocket, a piston adapted to be supported by said body and disposed in said pocket, and an adjustable and separable connection between said piston and said braking member and reached from without through said first mentioned member.

14. Wheel brake structure comprising a brake drum having converging braking surfaces, a complementary braking member cooperable therewith, a support for said member and having a pocket therein, a piston reciprocable in said pocket, means for operating said piston, and means having a smooth flat surface cooperable with said piston and said braking member for transmitting to said braking member the work done by said piston in a line of action normal to all portions of said braking surfaces, said means and said piston being slidable relative to each other in a plane normal to the radius of said brake drum whereby said braking member is free to move laterally as well as radially responsive to braking conditions.

15. Wheel brake structure comprising a rotatable hub casting, said casting including a radially extending flange member provided with an aperture, an annular member rigidly secured to the periphery of said flange and adapted to form therewith an annular chamber surrounding said hub, at least one of said members providing a braking surface, a fixed support projecting within said chamber, sealing means arranged between the inner periphery of said annular member and said support for closing said chamber, a movable element carried by said support within said chamber, means connected to said support externally of said chamber for operating said movable element, a braking element cooperable with said braking surface and supported by said support, an adjustable connection including a notched wheel operatively disposed between said braking element and said movable element, said notched wheel being engageable from without said chamber through said aperture for adjusting said connection, and a removable cap carried by said hub and arranged to close said aperture.

16. Wheel brake structure comprising a support including a flange located inside the centerline of the brake, an axle carried by said support, a sleeve disposed outwardly of said axle and supported thereby, said sleeve comprising a part of a wheel hub, said hub including a radially extending portion projecting from said hub outwardly of the centerline of the brake, a brake drum carried by said radially extending portion, an annular body directly connected to said flange and arranged between said axle and said brake drum, a sealing means arranged between one edge of said brake drum and said flange for enclosing the space within said drum, braking means supported by said body and cooperable with said drum, and means entering said brake structure outside the periphery of said sleeve for supplying energy through said body to said braking means for actuating the same.

17. Wheel brake structure including an axle supported from one end and a flange disposed outwardly of said axle and spaced from the unsupported end thereof, a sleeve disposed outwardly of said axle and supported thereby, said sleeve comprising a part of a wheel hub, said hub having projecting therefrom, adjacent the unsupported end of said axle, a radially extending portion, a brake drum supported at one side thereof by said portion and having the other side thereof unsupported, a body member directly secured to said flange and arranged between said brake drum and said sleeve, sealing means arranged between said body member and the unsupported side of said brake drum, braking means carried by said body member and cooperable with said brake drum, and means connected directly to said body member outside the periphery of said sleeve and passing through the body for actuating said braking means.

GEORGE H. HUNT.